No. 857,749. PATENTED JUNE 25, 1907.
G. W. McGILL.
METALLIC FASTENER.
APPLICATION FILED JAN. 7, 1907.

2 SHEETS—SHEET 1.

Witnesses
A. R. Appleman
W. Harry McGill

Inventor
George W. McGill

No. 857,749. PATENTED JUNE 25, 1907.
G. W. McGILL.
METALLIC FASTENER.
APPLICATION FILED JAN. 7, 1907.
2 SHEETS—SHEET 2.
Fig. 8.
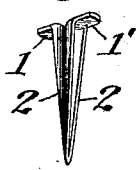
Fig. 9.
Fig. 10.
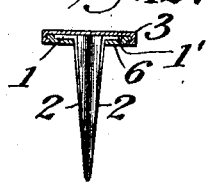
Fig. 12.
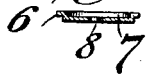
Fig. 11.
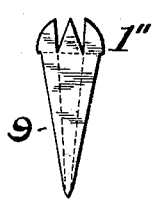
Fig. 13.
Fig. 14.
Fig. 15.
Fig. 17.
Fig. 16.
Fig. 18.
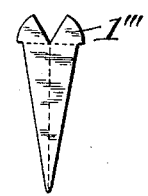
Fig. 19.
Fig. 20.
Fig. 21.
Fig. 23.
Fig. 22.
Fig. 25.
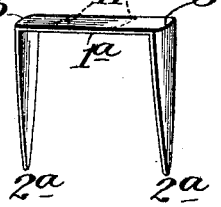
Fig. 26.
Fig. 24.
Fig. 27.
Witnesses
A. R. Appleman
W. Harry McGill
Inventor
George W. McGill

UNITED STATES PATENT OFFICE.

GEORGE W. McGILL, OF RIVERDALE-ON-HUDSON, NEW YORK.

METALLIC FASTENER.

No. 857,749.  Specification of Letters Patent.  Patented June 25, 1907.

Application filed January 7, 1907. Serial No. 351,198.

*To all whom it may concern:*

Be it known that I, GEORGE W. McGILL, a citizen of the United States, and a resident of Riverdale-on-Hudson, in the county of New York and State of New York, have invented certain new and useful Improvements in Metallic Fasteners, of which the following is a specification.

This invention relates particularly to that class of metallic fasteners, known as McGill fasteners, and generally used for connecting together sheets of paper, and for other light binding of various kinds; such fasteners being made from sheet metal and consisting of a heading part, connecting with two shank-blades, the shank-blades projecting from the head piece and normally lying together longitudinally by reason of which they make but a single hole when inserted through the material being fastened; such fastening being effected by separating the shank-blades and turning them over upon such material in opposite directions.

In the improved fastener, constructed as hereinafter set forth, the two blades providing the fastener-shank taper from the transverse fold of their heading part or end to the terminal of their free end and are each folded transversely in manner to bring both edges of each blade respectively into oppositely inclined planes, to the end that when the fastener shank is inserted through the papers or other material being fastened and its blades are folded apart and over upon such material, the edges of the blades will bear upon such material throughout the entire length of their folded-over portion, and will present above such material outwardly smooth convex surfaces decreasing in width and in height of convexity from the line of such fold to their free terminal.

Figure 1:
Figure 2:
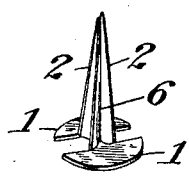
Figure 3:
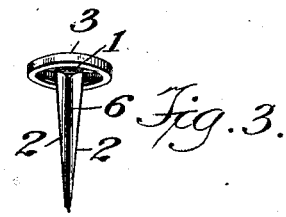
Figure 4:
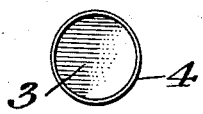
Figure 5:
Figure 6:
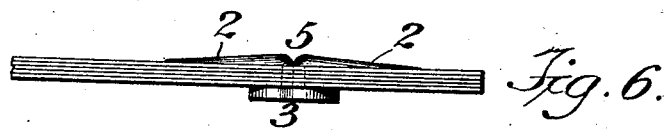
Figure 7:
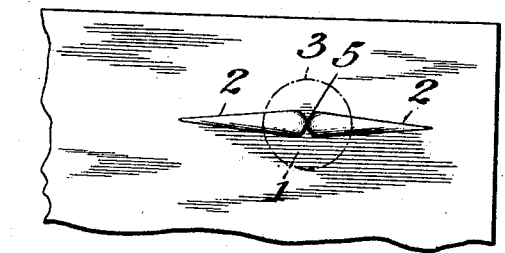

In the accompanying drawing forming part of this specification, and in which similar letters and numerals of reference indicate corresponding parts, Figure 1. is a plan view of a sheet metal blank from which the fastener is fashioned. Fig. 2. is a perspective view of such blank showing the blades of its bifurcated shank transversely curved and longitudinally set together back to back, as intended. Fig. 3. is an edge view partly in perspective of the completed fastener. Fig. 4. is a plan view of the fastener cap, and Fig. 5. is a cross section of such cap. Fig. 6. is an edge view of the completed fastener applied in fastening together several sheets of paper as intended and Fig. 7. is a plan view of Fig. 6. Figs. 8 to 12, inclusive, show a modification in the construction of the fastener wherein each blade of its bifurcated shank, including its heading or capping part, is made from separate pieces of metal; Fig. 8. being an edge or side elevation in perspective of one of the blades. Fig. 9. a similar view of both blades set with their convex surfaces facing each other throughout their length. Fig. 10. is a plan view of a bur or washer used in this construction of the fastener. Fig. 11. is a cross section of such washer and Fig. 12. is an edge view partly in section of the completed fastener so modified. Figs. 13 to 18, inclusive, illustrate further modifications in the construction of the fastener. Fig. 13. being a plan view of the blank of one of its shank-blades. Fig. 14. is a side elevation of such blade. Fig. 15. is a plan view of the folded over top or capping part of the blade. Fig. 16. is a transverse section of such blade. Fig. 17. is a plan view of a bur or washer used in holding together and capping both shank-blades, and Fig. 18. is a top view of the blades inserted back to back in such washer. Figs. 19. to 24, inclusive, illustrate a still further modification in the construction of the fastener, Fig. 19. being a plan view of the blank of one of its shank-blades. Fig. 20. a side elevation of such blade. Fig. 21, a plan view of the folded over top or capping part of such blade. Fig. 22. a cross section of such blade. Fig. 23. a plan view of a bur or washer used in holding together and capping a pair of such blades, and Fig. 24. a top view of the blades inserted back to back in such washer. Fig. 25. shows a modified formation of the metal blank providing the shank-blades. Figs. 26. and 27. show the fastener fashioned from a single strip or blank of sheet metal, Fig. 26. being a perspective view of the fastener blank partially folded and Fig. 27, a perspective view of the completed fastener as fashioned from such blank.

In the form of the fastener shown in Figs. 1 to 7, inclusive, a piece of sheet metal is cut into a fastener-blank as shown in Fig. 1. from which the unitary heading or capping part 1, and the two transversely curved shank-blades 2. 2. are fashioned with the blades springing directly from such heading part and tapering from their connection with such part to their free or pointed ends, and set with their convex surfaces normally facing each other lengthwise as shown in Fig. 2. The heading or capping part 1, is covered by the metal cap 3, the rim 4 of which is upset on the under surface of the capping part as shown in Fig. 3, completing the fastener and providing it a thin flat and smooth head and finished appearance.

The longitudinal fold or transverse curvature of the shank-blades and their rectangular connection on transversely curved lines with the heading part 1, imparts stiffness to the blades and rigidity to their roots, preventing the spreading apart of the latter on the separation and folding apart of the projecting or free portion of the blades over the material being fastened whereby any enlargement of the aperture made in the passage of the blades through such material is prevented.

The tapering of the shank-blades from their roots to their free ends and their transversely curved or longitudinally folded formation extending throughout their length sets the edges of each blade in a separate plane, which separate planes converge from the outer edges of such roots to the free end of the blades, so that when the shank of the fastener is passed through papers or other material being fastened, and its blades separated and turned down as at 5. on the surface of the material, their edges will lie flat upon and bear throughout their entire length against such surface and will present a uniformly smooth and even surface, gradually rising and widening from the free or pointed ends of the blades to their parting fold 5, in the bound material, and impart to their pointed terminals a tendency to normally bear against the surface of such material instead of a normal tendency to spring up therefrom as is the case in similar fasteners having flat shank-blades.

The normal position of the convex surface of the shank-blades in facing each other provides between their respective edges spaces 6, which during the process of dipping in the manufacture of the fasteners, enables the cleansing acids to reach and cleanse such surfaces; and in applying the fastener, these spaces admit of the ready insertion between the shank-blades of a knife blade, or other suitable instrument, to separate and fold them over upon the material being bound.

In the modified construction of the fastener, illustrated in Figs. 8 to 12, inclusive, the shank-blades are made from separate pieces of metal, and are tapered and transversely curved throughout their entire length, similar to the blades shown in Figs. 1 and 2, and are provided with a unitary heading or capping part 1'. The blades so constructed are placed back to back as in Fig. 9, and are inserted in a metal washer 6,— Figs. 10, 11, having a sunken or recessed center 7, provided with a slot 8, shaped to receive them and in which they are seated with the top surface of their heading parts flush with the top surface of the washer, and over which is closed a metal cap 3, as shown in Fig. 12, locking the parts together and providing the finished fastener.

In the modified construction of the fastener shown in Figs. 13 to 18, inclusive, the shank-blades are formed from flat sheet metal blanks 9, Fig. 13. tapering to a point at one end and provided with a semi-circular heading or capping part 1'' divided by two V-shaped slots into three sections. This blank is folded longitudinally along the two dotted lines shown thereon in manner to provide it the three faces as shown in Fig. 14, and a cross-section thereof Fig. 16, the sections of the capping part 1'' of the folded blank being now bent over rectangular with its body part assume without lapping each other, the formation shown in Fig. 15, and a pair of such blades set back to back are inserted in the slotted washer Fig. 17, with their roots occupying the slot 8' and their heading parts the recess 7' therein as shown in Fig. 18, in which position they are secured by a metal cap closed over the washer as in Fig. 12.

In the modified construction shown in Figs. 19 to 24, inclusive, the blank Fig. 19, which provides the shank-blades tapers in similar manner from its heading part 1''' to its pointed terminal, its heading part being divided by a V-shaped slot: the blank in this construction being folded longitudinally along its center providing it two faces as shown in Fig. 20, and in the cross section thereof Fig. 22, and the section of its capping part 1''' are bent over rectangular to the longitudinal direction of the blade as shown in the top view 21. Two of such blades are inserted, back to back, in the slot 8'' of the washer Fig. 23, with their heading parts occupying the recessed center 7'' thereof as shown in Fig. 24, in which position they are secured by a metal cap closed upon said washer in the manner shown in Fig. 12.

The shank receiving washers Figs. 10, 17, and 23, have a slit 10, extending from their central or shank-slot through their rim to admit of their being partly opened cross-wise in entering the folded shank blades in such slot. This slit 10, may be avoided by leaving the heading part of the shank-blades unfolded as in Fig. 25, and inserting such unfolded heading part through the shank-slot of the washer and then folding it over into its seat in the depressed center of the washer.

In the construction shown in Figs. 26 and 27, the fastener is made from a single strip of sheet metal having tapering end portions which are bent down from a center portion 1$^a$ on transversely curved lines 5 providing the shank-blades 2$^a$ of this construction. The center portion of the blank is then bent over upon itself on the dotted lines 11. Fig.

26, bringing the backs of the transversely curved or longitudinally folded shank-blades together as shown in Fig. 27, completing this construction of the fastener.

Having thus fully described the object construction and operation of my invention, what I claim therein as new and desire to secure by Letters Patent is:—

1. A metallic fastener consisting of a head part and a shank having two blades, each blade tapering from the transverse fold of its heading end to the terminal of its free end and folded longitudinally in manner to bring both of its edges into the same plane throughout their length, the blades being seated with their convex surfaces normally facing each other lengthwise.

2. A metallic fastener consisting of a head part and a shank having two longitudinally folded blades, both blades tapering from the transverse fold of their heading end to the terminal of their free end and seated with their convex surfaces normally facing each other throughout their length.

3. A metallic fastener having two longitudinally folded shank-blades which taper from their heading end to their free end and which are seated with their convex surfaces normally facing each other lengthwise, the longitudinal fold of the respective blades causing the two edges of one blade to face in a direction opposite to that of the two edges of the other blade, and to bring the edges of both blades, when the latter are folded apart on material being fastened, to bear against such material throughout the entire length of their folded over portion and to present outwardly above such material smooth convex surfaces decreasing in width and convexity from the line of such parting fold to their free-ends.

4. A metallic fastener of the character described wherein the two blades forming its shank are longitudinally folded and made tapering from their heading end to their free end and are seated together with their convex surfaces facing each other in manner that when the fastener is applied in binding material as herein described the blades of its shank on being folded apart and down upon the same will present outwardly above such material smooth convex surfaces decreasing in width and convexity from the line of such parting-fold to their free ends.

5. A metallic fastener consisting of a head part and a shank having two longitudinally folded blades which taper from the transverse fold of their heading end to the terminal of their free end, and which are seated with their convex surfaces normally facing each other throughout their length, and which have their heading ends inclosed in a metal cap.

6. A metallic fastener of the character described having a shank composed of two blades, each blade formed from a blank tapering from its heading end to its free end and longitudinally folded to provide thereon a plurality of tapering faces, the shank-blades being seated with their convex surfaces normally facing each other lengthwise.

Signed at Riverdale-on-Hudson in the county of New York and State of New York this 20th day of November A. D.,1906.

GEORGE W. McGILL.

Witnesses:
W. HARRY McGILL,
JACOB N. HAIGHT.